(12) United States Patent
Trimmer et al.

(10) Patent No.: US 10,399,165 B2
(45) Date of Patent: Sep. 3, 2019

(54) ELECTRODE AND METHOD FOR MANUFACTURING THE SAME

(71) Applicant: General Electric Company, Schenectady, NY (US)

(72) Inventors: Andrew Lee Trimmer, Niskayuna, NY (US); Yuanfeng Luo, Shanghai (CN); Bin Wei, Mechanicville, NY (US); John Broddus Deaton, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 677 days.

(21) Appl. No.: 14/374,922

(22) PCT Filed: Jan. 18, 2013

(86) PCT No.: PCT/US2013/022010
§ 371 (c)(1),
(2) Date: Jul. 28, 2014

(87) PCT Pub. No.: WO2013/119372
PCT Pub. Date: Aug. 15, 2013

(65) Prior Publication Data
US 2015/0014281 A1 Jan. 15, 2015

(30) Foreign Application Priority Data
Feb. 7, 2012 (CN) .......................... 2012 1 0026442

(51) Int. Cl.
*B23H 1/04* (2006.01)
*B23H 1/06* (2006.01)
(Continued)

(52) U.S. Cl.
CPC .............. *B23H 1/04* (2013.01); *B22F 3/1055* (2013.01); *B22F 7/06* (2013.01); *B23H 1/06* (2013.01);
(Continued)

(58) Field of Classification Search
CPC ... B23H 7/12; B23H 1/04; B23H 1/06; B23H 7/22; B23H 7/24
See application file for complete search history.

(56) References Cited

U.S. PATENT DOCUMENTS 6,602,561 B1    8/2003  Moro et al.
6,858,125 B2    2/2005  Wei et al.
(Continued)

FOREIGN PATENT DOCUMENTS

CN    1272144 A     11/2000
CN    101108433 A    1/2008
(Continued)

OTHER PUBLICATIONS

Unofficial English Translation of Chinese Office Action issued in connection with corresponding CN Application No. 201210026442.4 dated Nov. 3, 2014.
(Continued)

*Primary Examiner* — Thien S Tran
(74) *Attorney, Agent, or Firm* — GE Global Patent Operation; Rong Zhang

(57) ABSTRACT

An electrode applied in electro-machining processes, where the electrode includes a main body portion and at least one built-in internal flushing passage for introducing a flushing liquid to a volume between the electrode and a workpiece to be machined. The electrode is made by an additive fabrication process that enables specialized flushing for enhancing waste material evacuation and incorporate special material properties like zones of high electrical conductivity and
(Continued)

thermal resistance. The fabrication process produces materials and geometries that could not otherwise be made using conventional processing.

10 Claims, 4 Drawing Sheets

(51) Int. Cl.
    *B23H 1/10* (2006.01)
    *B23H 7/12* (2006.01)
    *B22F 3/105* (2006.01)
    *B22F 7/06* (2006.01)
    *B23H 7/22* (2006.01)
    *B23H 7/24* (2006.01)
    *B23H 7/36* (2006.01)

(52) U.S. Cl.
    CPC ............... *B23H 1/10* (2013.01); *B23H 7/12* (2013.01); *B23H 7/22* (2013.01); *B23H 7/24* (2013.01); *B23H 7/36* (2013.01); *Y02P 10/295* (2015.11); *Y10T 29/49204* (2015.01)

(56) References Cited

U.S. PATENT DOCUMENTS

| | | |
|---|---|---|
| 7,020,539 B1 | 3/2006 | Kovacevic et al. |
| 7,741,576 B2 | 6/2010 | Trimmer et al. |
| 7,777,155 B2 | 8/2010 | Twelves et al. |
| 2007/0256939 A1 | 11/2007 | Wei et al. |
| 2010/0126877 A1 | 5/2010 | Luo et al. |
| 2011/0073486 A1 | 3/2011 | Trimmer et al. |

FOREIGN PATENT DOCUMENTS

| | | |
|---|---|---|
| EP | 2255912 A2 | 12/2010 |
| FR | 2149789 A5 | 3/1973 |
| JP | 2008073783 A | 4/2008 |
| WO | 02096587 A1 | 12/2002 |

OTHER PUBLICATIONS

Rhoney et al., "Wire Electrical Discharge Machining of Metal Bond Diamond Wheels for Ceramic Grinding", International Journal of Machine Tools and Manufacture, vol. 42, Issue 12, pp. 1355-1362, Sep. 2002.

"Laser Additive Manufacturing Enables Next Generation Parts", OptoIQ, Feb. 4, 2011, East Hartford, Connecticut.

"GE Intensifies Focus on Additive Manufacturing", Press Releases, May 4, 2011, Niskayuna, New York.

ELECTRODE AND METHOD FOR MANUFACTURING THE SAME

BACKGROUND

The present invention relates generally to electrodes and methods for manufacturing the electrodes, and, more specifically, to electrodes applied in electro-machining processes and their manufacturing methods.

Electro-machining is a process for applying electric energy to a workpiece to effect removal of material, and it can be roughly divided into two categories based on the material removal process. The first category is electric discharge machining (EDM), in which thermal energy flows between a tool-electrode and the workpiece, causing material to be removed from the workpiece. The second category is electrochemical machining (ECM), in which an oxidation reaction occurs at the workpiece due to a chemical potential difference from the applied electric field and material is removed from the workpiece.

EDM is a manufacturing process whereby a desired shape is obtained using electrical discharges (sparks or thermal events). A tool and a workpiece, functioning as two electrodes, are separated by a dielectric liquid and subject to an electric voltage. The tool may be called the tool-electrode, or simply the "electrode", while the workpiece may be called the workpiece-electrode. Material is removed from the workpiece by a series of rapidly recurring current discharges between the electrode and the workpiece.

When the distance between the electrode and the workpiece is reduced, the intensity of the electric field in the volume between the electrode and the workpiece (inter-electrode volume) becomes greater than the strength of the dielectric (at least in some point(s)), which breaks down, allowing current to flow between the electrode and the workpiece creating arc or spark discharges. As a result of the arc or spark an enormous amount of thermal energy is generated which melts a small quantity of material from both the electrode and the workpiece, and the melt is convected into the dielectric liquid, in which it is cooled to form solid particles or debris. After an electric discharge event the current flow stops, and new liquid dielectric is conveyed into the inter-electrode volume enabling the solid particles or debris to be carried away and the insulating properties of the dielectric to be restored. Adding new liquid dielectric in the inter-electrode volume is commonly referred to as flushing. Also, after a current flow, the potential difference between the electrode and the workpiece is restored to what it was before the breakdown, so that a subsequent liquid dielectric breakdown can occur.

ECM is a method of removing metal by an electrochemical reduction/oxidation process. It is similar in concept to EDM in that a potential gradient is applied between an electrode and a workpiece. Ions pass through an electrolytic material facilitating the removal process using a negatively charged electrode (cathode), a conductive fluid (electrolyte), and a conductive workpiece (anode). Contrary to EDM, in ECM no sparks are created and there is typically no electrode wear. In the ECM process, the electrode is advanced toward the workpiece but without touching the workpiece. The gap between the electrode and the workpiece may vary within 8-800 micrometers. The pressurized electrolyte is injected at a set temperature to the area being cut. As ions cross the gap, material from the workpiece is dissolved. The electrode is guided along the desired path to form the desired shape in the workpiece.

In addition, there is another technology utilizing thermal events to drive material removal, i.e., high speed electro-errosion (HSEE), which has been developed recently for machining difficult-to-machine, high-performance alloy workpieces. The HSEE process is applied to electrically conductive workpieces. In the HSEE process, the material removal takes place mainly due to the effect of thermal action but some electrochemical reaction occurs.

As to electrodes applied in electro-machining processes, especially for EDM and HSEE processes, electrical conductivity and thermal arc resistance are critical parameters. In some circumstances, electrodes with both high electrical conductivity and high thermal arc resistance may be required. Moreover, the electrodes may have specially tailored geometries, and possibly, need unique electrolyte flushing channels. The special tool geometries typically enable directed and uniquely tuned flushing in the cut zone. Flushing through the tool in this way improves chip evacuation thus reducing thermal damage at the part. A part with less thermal damage due to cutting will have longer life, a simplified manufacturing sequence, and a lower production cost. Therefore, making tools with specialized flushing manifolds that are complex build-ins and with tuned material properties like arc-resistance and electrical conductivity is highly desirable. However, there is no existing electrode which is able to meet the requirements using existing, conventional electrode fabrication methods like casting, milling, and turning. Often it is not possible to economically produce electrodes with both high electrical conductivity and high thermal arc resistance that additionally possess special geometries that enable unique flushing in the cutting zone.

Therefore, there is a need for both a new and improved electro-machining electrode with unique flushing geometries, material properties, and a method for fabricating the electrode.

BRIEF DESCRIPTION

In one aspect, embodiments of the present invention provide an electrode applied in electro-machining processes. The electrode comprises a main body made from an additive material fabrication process, which enables electrical conductivity and arc resistance of the main body to be tuned based on materials used, and also enables at least one internal flushing channel to be installed into the electrode. The electrode further comprises at least one internal flushing channel used to introduce a flushing liquid to a volume between the electrode and a workpiece to be machined, to enhance waste material evacuation due to machining.

In another aspect, embodiments of the present invention provide a method for manufacturing an electrode using an additive manufacturing process. The method comprises: providing a digital representation, such as a CAD (Computer Aided Design) model, of an electrode with at least one built-in internal flushing passage for internal liquid flushing; creating a sequence or stack of layers based on the digital representation, applying manufacturing parameters to each of those layers based on the digital representation; and producing the physical electrode by sequentially adding and consolidating material for each layer on top of the previous layer until the entire electrode is completed.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

Embodiments of the present disclosure will be described hereinbelow with reference to the accompanying drawings. In the subsequent description, well-known functions or constructions are not described in detail to avoid obscuring the disclosure in unnecessary detail.

Approximating language, as used herein throughout the specification and claims, may be applied to modify any quantitative representation that could permissibly vary without resulting in a change in the basic function to which it is related. Accordingly, a value modified by a term or terms, such as "about" or "substantially", is not to be limited to the precise value specified. In some instances, the approximating language may correspond to the precision of an instrument for measuring the value.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Embodiments of the present invention take benefit by using material combinations achieved by unique fabrication methods to provide various specific electrodes for machining workpieces, for example, electrodes with both high electrical conductivity and high thermal arc resistance, and possibly, with built-in flushing channels, and moreover, possibly in specially tailored geometries.

In one aspect, embodiments of the present invention provide a specific electrode. The electrode comprises a main body made from an additive material fabrication process, which enables electrical conductivity and arc resistance of the main body to be tuned based on materials used, and also enables at least one internal flushing channel to be installed into the main body. The electrode also comprises one or more internal flushing channels used to introduce a flushing liquid to a volume between the electrode and a workpiece to be machined, to enhance evacuation of the waste material produced by machining.

In certain embodiments, the whole main body of the electrode may be made from a single material. Alternatively, in certain embodiments, different portions of the main body of the electrode may be made from different materials.

Figure 1:
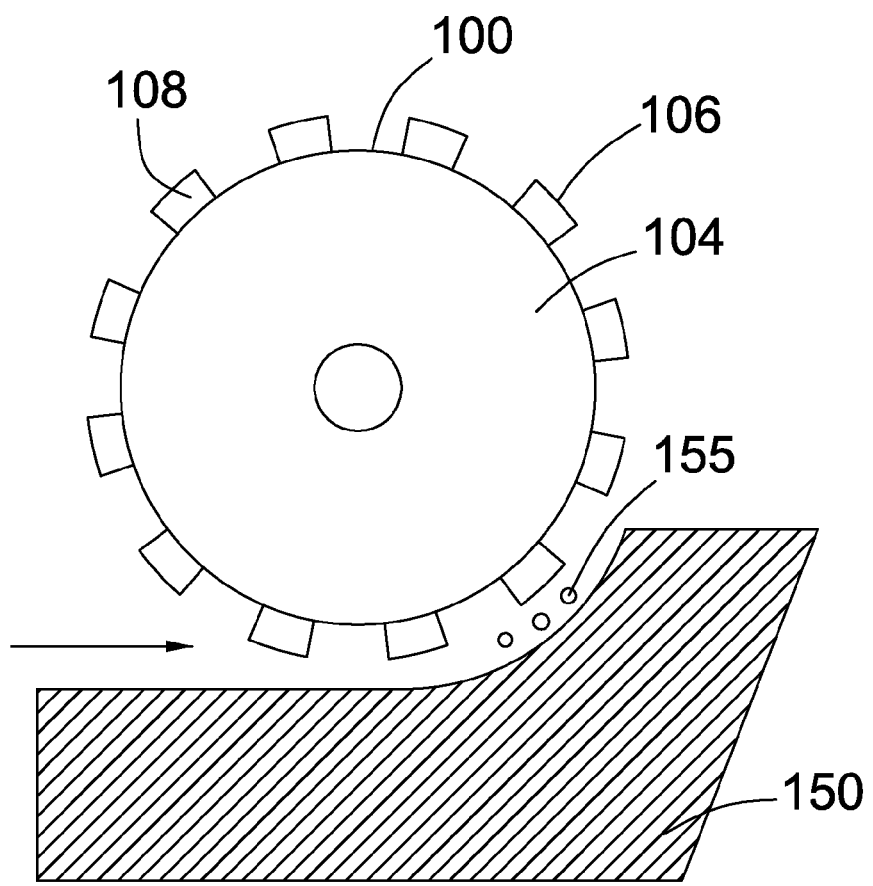
FIG. 1 is a schematic diagram showing an exemplary electrode being applied to machine a workpiece, in accordance with one embodiment of the present invention.

In one embodiment, the main body of the electrode comprises at least two portions made from different materials but integratedly formed together through an additive material fabrication process. For example, in an electrode 100 as shown in FIG. 1, a main body comprises a main portion 104, and a machining portion 106 designed to electrically interact with a workpiece 150 to be machined. The machining portion 106 is designed to act on the workpiece 150 and then is able to cut chips 155 from the workpiece via electric energy. For the illustrated arrangement, the machining portion 106 comprises a plurality of machining elements 108 protruding beyond an outer surface of the main portion 104 and spaced away from each other. The main portion 104 and the machining portion 106 are made from different materials, but are integrally combined through an additive material fabrication process. In certain embodiments, the machining portion 106 may be either conductive or nonconductive and have desired thermal arc resistance and/or hardness. In one embodiment, the main portion 104 is made from a first electrically conductive material, and the machining portion 106 is made from a second electrically conductive material having a melting point higher than that of the first electrically conductive material. The first and second electrically conductive materials provide the electrode with a good electrical conductivity, and the second electrically conductive material provides the machining portion with a good thermal arc resistance as well. In one embodiment, the first electrically conductive material comprises at least one of copper, nickel, aluminum, and iron. The second electrically conductive material may be refractory material having a melting point higher than about 1800° C. In one embodiment, the refractory material comprises at least one of tungsten, molybdenum, and chromium.

The internal flushing passage fabricated within the electrode through the additive material fabrication process endures high pressure and thereby supplies high pressure flushing to the volume between the electrode and the workpiece to be machined. The internal flushing passage may be complex in shape. In one embodiment, the internal flushing passage comprises a curved channel built within the electrode.

In a certain embodiment, the additive material fabrication process can be defined as a process of joining materials to make one or more objects from digital data such as 3D CAD (Computer Aided Design) model data, usually layer upon layer, as opposed to subtractive manufacturing methods such as traditional machining An additive material fabrication process is capable of directly manufacturing finished components based on just three inputs: a raw construction material or materials (often in the form of powder or wire for metals processes), energy for consolidation of that construction material (often a laser beam, electron beam, or arc source for metals processes, and a digital representation (CAD model) of the component. Examples of additive material fabrication processes include but are not limited to, powder-bed methods such as selective laser melting, direct metal laser sintering, and electron-beam melting, or 3-dimensional ink-jet printing as well as powder- or wire-fed methods such as 3-dimensional cladding or laser forming.

Metal powder-bed additive manufacturing methods combine precision powder bed formation for material deposition with high-resolution laser- or electron-beam micro-welding for direct material consolidation of fine, uniformly sized powders. For example, in a selective laser melting process, a uniformly thick layer of metal powder is first spread on a suitable metal substrate, and then a laser beam is scanned across the powder bed in a specified pattern so as to weld and attach the first layer in the part to the build substrate. The steps of powder spreading and laser micro-welding then are repeated layer after layer until the final layer is consolidated and the part is completed. Complex internal passages, cavities or lattice macrostructures are readily created by leaving the loose powder material unconsolidated in those regions for removal after the build is completed. In contrast, powder- or wire-fed 3-dimensional cladding processes are accomplished by directing a laser beam, electron beam, or arc source at a substrate to create a melt pool while adding powder or wire material into the melt pool. To create the desired geometry, the beam is scanned to carry the melt pool across the substrate while material is continuously added to the moving melt pool. For example, in a powder laser forming process, a laser beam heats the substrate to produce a melt pool that is scanned across the substrate and metal powder is sprayed from a powder delivery nozzle and injected into the moving melt pool to produce consolidated material. Once the initial layer is completely formed, these steps are repeated layer after layer until the final layer is consolidated and the part is completed.

Figure 2:
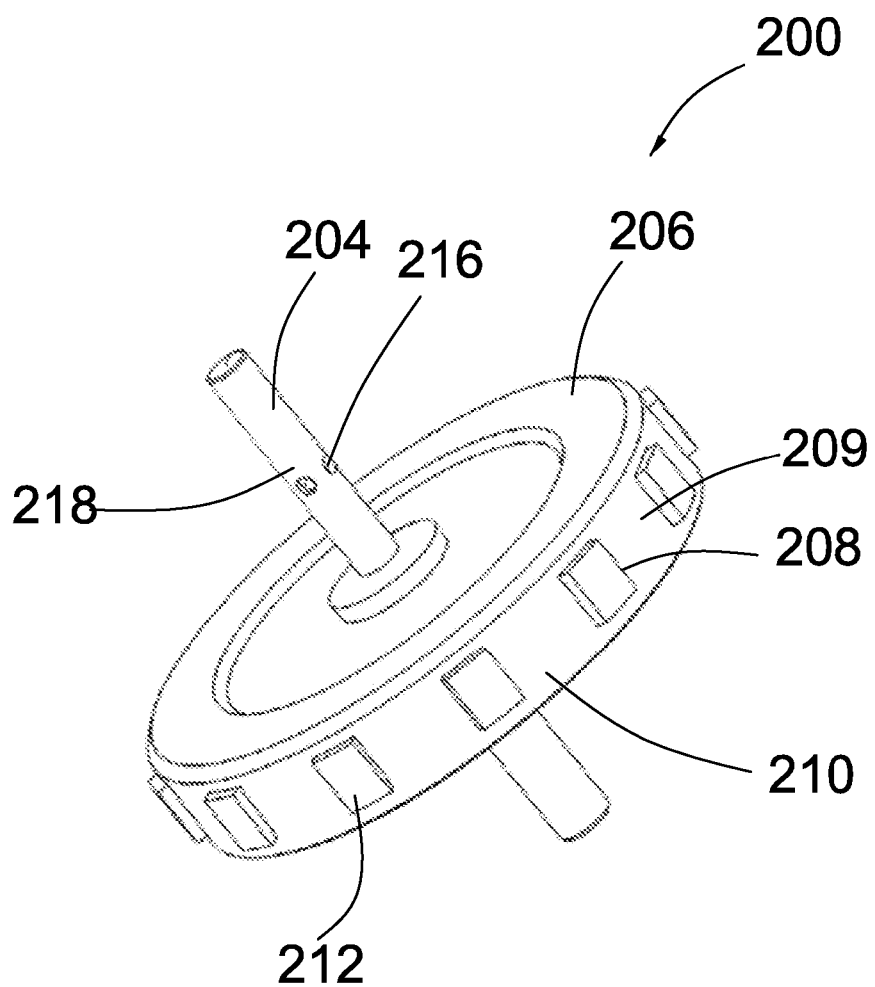
FIG. 2 is a perspective view of an exemplary electrode in accordance with one embodiment of the present invention.
Figure 3:
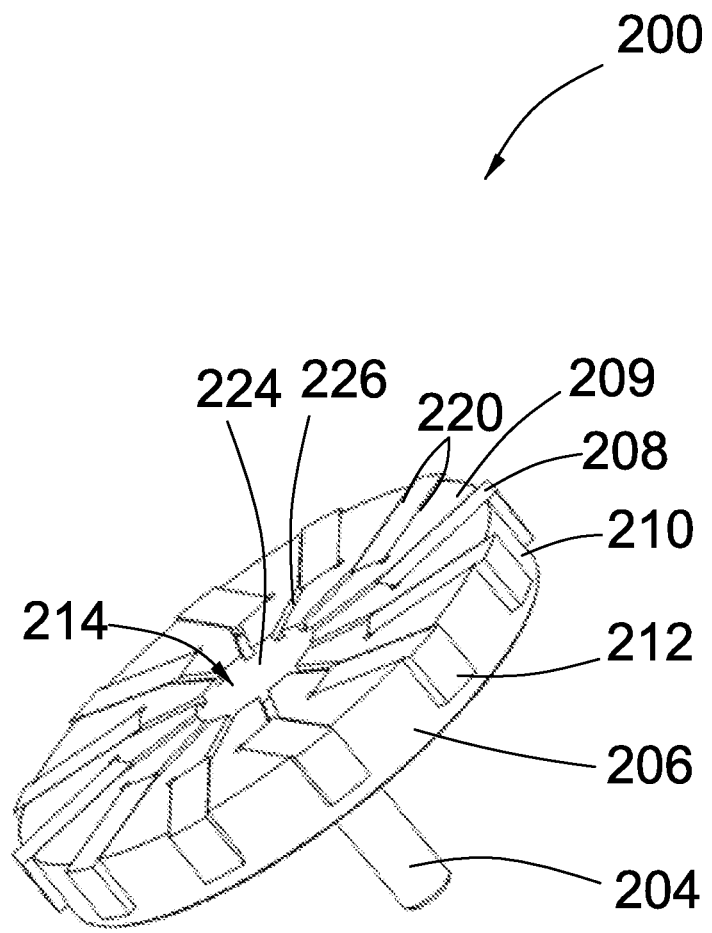
FIG. 3 is a partially cut-away perspective view of the electrode of FIG. 2, showing internal channels of a hub of the electrode.

FIG. 2 and FIG. 3 show an electrode 200 fabricated by an additive material fabrication process. The electrode 200 is configured in a wheel shape and comprises an elongated rotating shaft 204 and a hub 206 that can rotate with the rotating shaft 204. A plurality of blocks 208 protrude beyond a circumferential outer surface 210 of the hub 206 to function as machining elements, which form a discontinuous circumferential outer surface 212 for facing and acting on the workpiece to be machined to remove materials from the workpiece via electric energy. In the illustrated arrangement, due to the protruding blocks, the hub 206 therefore is segmented into a plurality of spaced discharge sections 209 by the machining elements 208 (see FIG. 3). The discharge sections 209 and the machining elements 208 may be disposed alternately for performing the electro-machining.

The additive material fabrication process enables the rotating shaft 204, the hub 206 and the blocks 208, which are integratedly formed together, to be made from same or different materials. In a certain embodiment, the whole electrode 200 is made from a same material. Alternatively, in a certain embodiment, at least two of the rotating shaft 204, the hub 206 and the blocks 208 are made from different materials. For example, the blocks 208 may be made from one material while the rest of the electrode 200, i.e., a main portion of the electrode 200 including the rotating shaft 204 and the hub 206, is made from a different material. In one embodiment, the blocks 208 are made from an electrically conductive material (e.g., tungsten, molybdenum or their alloys) having a melting point higher than that makes the rest of the electrode 200 (e.g., copper or its alloys).

FIG. 3 is a cross section view showing an internal structure of the hub 206. As shown in FIG. 3, the electrode 200 comprises an internal flushing channel 214 for introducing a flushing liquid to a volume between the electrode and a workpiece to be machined. The flushing channel 214 is fabricated through an additive material fabrication process and therefore is capable of enduring high pressure during high pressure flushing. In the illustrated embodiment, the internal flushing channel 214 connects entrances 216 on a circumferential outer surface 218 of the rotating shaft 204, with a plurality of slots 220 defined between the blocks 208 and the discharge sections 209. The flushing channel 214 comprises a central hole (not shown) extending within the rotating shaft 204 from the entrances 216 to a center hollow passage 224 of the hub 206, and a plurality of channels 226 connecting the center hollow passage 224 and the plurality of slots 220 where the flushing liquid exits the electrode, respectively.

Figure 4:
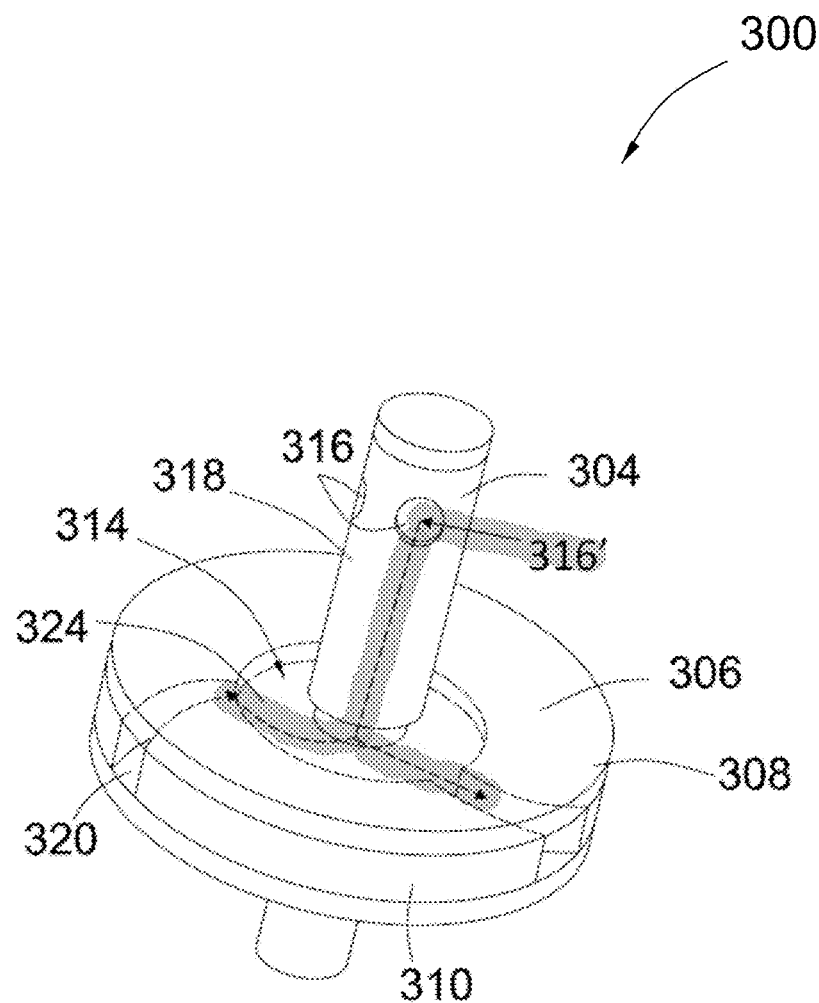
FIG. 4 is a perspective view of an exemplary electrode in accordance with another embodiment of the present invention.

Referring to FIG. 4, another electrode 300 made by an additive material fabrication process is provided. The electrode 300 is configured in a wheel shape and comprises an elongated rotating shaft 304 and a hub 306 that can rotate with the rotating shaft 304. An outer circumferential layer 308 of the hub 306 functions as a machining portion and provides a circumferential outer surface 310 for facing and acting on the workpiece to machine material from the workpiece. The additive material fabrication process allows various material combinations and therefore different portions of the electrode can be made from different materials. In one embodiment, the outer circumferential layer 308 is made from an electrically conductive material having a melting point that is higher than that of the material used to produce the rest of the electrode 300. In one embodiment, the outer circumferential layer 308 has a thickness ranging from 5 mm to 15 mm. In a specific embodiment, the outer circumferential layer 308 has a thickness approximately of 10 mm.

The electrode 300 further comprises a built-in internal flushing passage 314 for introducing a flushing liquid to a volume between the electrode and a workpiece to be machined. The flushing channel 314 is fabricated with an additive material fabrication process and therefore is capable of enduring high pressure during high pressure flushing. In the illustrated embodiment, the internal flushing passage 314 connects entrances 316 on a circumferential outer surface 318 of the rotating shaft 304, with at least one, or preferably, a plurality of exits 320 on the circumferential outer surface 310. The flushing passage 314 comprises a central hole (not shown), extending within the rotating shaft 304 from the entrances 316 to a center hollow passage 324 of the hub 306, and a plurality of curved channels 326 connecting the center hollow passage 324 and the plurality of exits 320 where the flushing liquid exits the electrode, respectively. The channels 326 are curved in a manner that the flushing liquid can be stably and uniformly delivered to the exits during rotation of the electrode 300. It should be noted that the built-in internal flushing passage 314 inside the electrode 300 that is represented with dotted lines actually is invisible, and it is shown for the convenience of illustration only.

In use, current flows to the electrode to machine a workpiece, while a flushing liquid flows through internal passages in the electrode to a volume between the electrode and the workpiece, enabling the solid particles or debris removed from the workpiece to be carried away and the workpiece to be cooled.

In another aspect, a method for manufacturing an electrode with an additive manufacturing system is provided. The additive manufacturing system used herein refers to a system, such as a selective laser melting system or an electron beam melting system, wherein materials are added sequentially in a layer-by-layer fashion with the purpose of creating a component. In certain embodiments, the additive manufacturing system comprises a powder delivery nozzle and a thermal source. In one embodiment, the additive manufacturing system comprises a laser forming device. The method comprises: providing a digital representation, such as a CAD (Computer Aided Design) model, of an electrode with at least one built-in internal flushing passage for internal liquid flushing; creating a sequence or stack of layers based on the digital representation, applying manufacturing parameters to each of those layers based on the digital representation; and producing the physical electrode by sequentially adding and consolidating material for each layer on top of the previous layer until the entire electrode is completed.

The processes of adding material and consolidating material may be executed in parallel, or in sequence, or a combination of both. For example, in powder-bed methods, the powder is spread on a substrate, and then consolidated by scanning across the powder bed using a laser beam. In certain embodiments, the material is consolidated while the material is added to the build region. For example, in one embodiment, the powder delivery nozzle and the laser beam may be coaxially installed to consolidate material while the material is added to the build region.

In one embodiment, the associated manufacturing parameters created for each of the layers in the digital representation comprise parameters for fabricating at least one built-in internal flushing channel of the electrode. In one embodiment, the material is delivered and added under a gas. In one embodiment, the material is added in the form of powder having a particle size ranging from about 50 microns to about 250 microns.

Producing an electrode with an additive manufacturing process allows practical fabrication of delicate and complex interior flushing channel geometries which are impossible to create by conventional metal processing methods such as machining, casting, or molding. Additive manufacturing of an electrode also allows novel material combinations in which material composition gradients may be formed, for example, by slowly changing the powder during the building process. Material composition gradients allow altering either the arc resistance or the electrical conductivity in different regions of the final electrode.

In certain embodiments, the use of an additive manufacturing process may comprise consolidating a first electrically conductive material in one or more layers, or regions of layers according to the digital representation of the electrode while consolidating a second electrically conductive material having a melting point higher than that of the first electrically conductive material in the alternate layers or regions of the layers according to the digital representation of the electrode.

In one embodiment, powder of the first electrically conductive material is delivered additively to a build layer or region of a layer under a cover gas while a thermal source, such as a laser, is used to join the powder together. The process is repeated until a first portion of a desired shape is obtained. Then powder of the second electrically conductive material is delivered additively to alternate layers or regions of layers and joined together onto the first portion, and the process is repeated until a second portion of a desired shape is obtained. The delivery and joining of the first and second electrically conductive materials using an additive manufacturing process may be alternated and/or repeated until the final shape is obtained. The final shape may have a series of internal cavities and channels with complex geometries that are useful for internal liquid flushing.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

What is claimed is:

1. An electrode applied in electro-machining processes, comprising:
   a main body made from an additive material fabrication process, which enables electrical conductivity and arc resistance of the main body to be tuned based on materials used and at least one internal flushing channel to be installed into the electrode; and
   at least one internal flushing channel used to introduce a flushing liquid to a volume between the electrode and a workpiece to be machined, to enhance evacuation of waste material produced by machining,
   wherein the main body comprises at least two portions made from different materials but integratedly formed together through the additive material fabrication process, wherein the at least two portions further comprises a main portion and a machining portion integrated with the main portion;
   wherein the main portion comprises a rotating shaft and a hub capable of rotating with the rotating shaft, and the machining portion is integratedly formed on the hub; and
   wherein the internal flushing channel connects entrances on the rotating shaft with a plurality of exits adjacent to the machining portion, respectively.

2. The electrode according to claim 1, wherein the internal flushing channel comprises at least one curved channel.

3. The electrode according to claim 2, wherein the curved channel is curved in a manner to facilitate flushing liquid delivery during rotating of the electrode.

4. The electrode according to claim 1, wherein the additive material fabrication process is a laser forming process.

5. The electrode according to claim 1, wherein the machining portion is configured to act on a workpiece to be machined in order to remove materials from the workpiece, and wherein the main portion is made from a first electrically conductive material, and the machining portion is made from a second electrically conductive material having a melting point higher than that of the first electrically conductive material.

6. The electrode according to claim 5, wherein the first electrically conductive material comprises at least one of copper, nickel, aluminum, and iron.

7. The electrode according to claim 5, wherein the second electrically conductive material has a melting point higher than about 1800° C.

8. The electrode according to claim 7, wherein the second electrically conductive material comprises at least one of tungsten, molybdenum, and chromium.

9. The electrode according to claim 5, wherein the machining portion provides a circumferential outer surface for acting on the workpiece to be machined.

10. An electrode applied in electro-machining processes, comprising:
    a main body made from an additive material fabrication process, which enables electrical conductivity and arc resistance of the main body to be tuned based on materials used and at least one internal flushing channel to be installed into the electrode; and
    at least one internal flushing channel used to introduce a flushing liquid to a volume between the electrode and a workpiece to be machined, to enhance evacuation of waste material produced by machining;
    wherein the main body comprises a main portion and a machining portion made from different materials but integratedly formed together through the additive material fabrication process, and the machining portion is configured to act on a workpiece to be machined in order to remove materials from the workpiece, and wherein the main portion is made from a first electrically conductive material, and the machining portion is made from a second electrically conductive material having a melting point higher than that of the first electrically conductive material;

wherein the main portion comprises a rotating shaft and a hub capable of rotating with the rotating shaft, and the machining portion is integratedly formed on the hub; and wherein the internal flushing channel connects entrances on the rotating shaft with a plurality of exits adjacent to the machining portion, respectively.

* * * * *